United States Patent
Guldner et al.

(10) Patent No.: US 8,285,580 B2
(45) Date of Patent: Oct. 9, 2012

(54) SYSTEM AND METHOD FOR FILTERING EXCEPTIONS GENERATED BY FORECASTING AND REPLENISHMENT ENGINE

(75) Inventors: Andreas Guldner, Ueberherm (DE); Christine Fotteler, Winnetka, IL (US); Wolfgang Schuhn, Saarbruecken (DE); Markus Schwingel, Ottweiler (DE); Joern Keller, Ottweiler (DE)

(73) Assignee: SAP AG, Walldorf (DE)

( * ) Notice: Subject to any disclaimer, the term of this patent is extended or adjusted under 35 U.S.C. 154(b) by 374 days.

(21) Appl. No.: 12/634,198

(22) Filed: Dec. 9, 2009

(65) Prior Publication Data
US 2010/0153343 A1    Jun. 17, 2010

Related U.S. Application Data

(63) Continuation of application No. 11/135,268, filed on May 24, 2005, now Pat. No. 7,657,453.

(60) Provisional application No. 60/633,436, filed on Dec. 7, 2004, provisional application No. 60/583,894, filed on Jun. 30, 2004.

(51) Int. Cl.
*G06Q 10/00* (2006.01)
(52) U.S. Cl. ....................... 705/7.25; 705/7.11
(58) Field of Classification Search .................. None
See application file for complete search history.

(56) References Cited

U.S. PATENT DOCUMENTS

| | | | |
|---|---|---|---|
| 5,442,788 A * | 8/1995 | Bier | 715/751 |
| 6,360,217 B1 * | 3/2002 | Gopal et al. | 1/1 |
| 6,414,594 B1 * | 7/2002 | Guerlain | 340/506 |
| 6,430,568 B1 * | 8/2002 | Hickey et al. | 1/1 |
| 6,601,233 B1 | 7/2003 | Underwood | |
| 6,609,101 B1 * | 8/2003 | Landvater | 705/7.25 |
| 6,617,969 B2 * | 9/2003 | Mi et al. | 340/517 |
| 6,750,766 B1 * | 6/2004 | Heitner et al. | 340/525 |
| 6,954,736 B2 * | 10/2005 | Menninger et al. | 705/28 |
| 7,003,474 B2 | 2/2006 | Lidow | |
| 7,003,560 B1 | 2/2006 | Mullen et al. | |
| 7,092,929 B1 | 8/2006 | Dvorak et al. | |
| 7,155,402 B1 * | 12/2006 | Dvorak | 705/14.41 |
| 7,376,902 B2 * | 5/2008 | Lueckhoff | 715/752 |

(Continued)

OTHER PUBLICATIONS

SAP Announces Advanced Forecasting and Replenishment Solution for Retailers; Alliance with SAF Retail Industry with Powerful Supply Chain Functionality. Business Wire. Jun. 25, 2002.

*Primary Examiner* — Lynda Jasmin
*Assistant Examiner* — Brett Feeney
(74) *Attorney, Agent, or Firm* — Kenyon & Kenyon LLP

(57) ABSTRACT

A system and method for storing, filtering, selecting and manipulating business exceptions generated by forecasting and replenishment processes and systems. When an exception is generated, it will be associated with attributes corresponding to those business objects and business areas to which the exception relates. Exceptions may also be associated with administrative attributes such as status, priority and generation date, as well as information identifying the specific business process that generated the exception. Generated forecasting and replenishment exceptions may be directed to a transitory dialog message. Alternatively, forecasting and replenishment exceptions may be logged or stored in a database for future review and treatment. Within an exceptions monitor or workbench tool, a business replenishment specialist may browse, search, select, review, filter, rearrange, edit, forward and/or respond to generated exceptions. Exceptions may be filtered tacitly according to a user profile associated with the business replenishment specialist. Alternatively, exceptions may be filtered according to explicitly supplied selection criteria.

19 Claims, 10 Drawing Sheets

U.S. PATENT DOCUMENTS

| | | | |
|---|---|---|---|
| 7,657,453 B2 * | 2/2010 | Guldner et al. | 705/7.11 |
| 2002/0032742 A1 * | 3/2002 | Anderson | 709/206 |
| 2002/0049838 A1 * | 4/2002 | Sylor et al. | 709/224 |
| 2002/0129354 A1 * | 9/2002 | Bryan et al. | 717/176 |
| 2002/0154010 A1 * | 10/2002 | Tu et al. | 340/517 |
| 2002/0156601 A1 * | 10/2002 | Tu et al. | 702/188 |
| 2002/0157017 A1 * | 10/2002 | Mi et al. | 713/200 |
| 2003/0033180 A1 * | 2/2003 | Shekar et al. | 705/7 |
| 2003/0097485 A1 * | 5/2003 | Horvitz et al. | 709/313 |
| 2003/0208392 A1 * | 11/2003 | Shekar et al. | 705/8 |
| 2004/0139001 A1 | 7/2004 | Henriques et al. | |
| 2004/0225718 A1 * | 11/2004 | Heinzel et al. | 709/206 |
| 2005/0209732 A1 | 9/2005 | Audimoolam et al. | |

* cited by examiner

| Selection for the Exception Workbench | | |
|---|---|---|
| Selection Variant | STORE 130 | ☑ Use This Selection Variant as Default |
| Description | SELECTION FOR STORE 130 | |

By Business Criteria / By Technical Attribute

Priority and Message Type
Priority ☑☐ ☑△ ☑○
Message Type ☑🛑 ☑📄 ☑🏠

Time and User
| | | Defined Time Horizon | | | |
|---|---|---|---|---|---|
| Creation Time | Date | 23.01.2004 | Time 00:00:00 | To Date 23.02.2004 | Time 23:59:59 |
| | | Defined Time Horizon | | | |
| Expiration Date | Date | 23.02.2003 | | To Date 23.04.2005 | |
| User | | | | To ⇧ | |

Subscription Check and Status
Subscription Check ○ On ⦿ Off
Status ☑ Not yet Processed ☑ Processed

FIG.7

Display: F&R Exceptions

Exception Workbench

User: C5035044
Selection Variant: Store130

Exception Generating Process/Business Area/...

- Exceptions...
  - Automatic Forecast and Replenishment
    - Consumption
    - Forecast
    - Inventory Management
    - Master Data
    - Order Quantity Optimization
    - Replenishment
      - S130
    - System Administration
  - Data Consistency Check
  - Dialog Process
  - Order Proposal Release Management Exceptions: S130

| Exception Test | Exc Ctime | CDate | Prio | LTxt | Ex... |
|---|---|---|---|---|---|
| Max. target stock will be exceeded for prod. FRE_PROD_03108 in loc. S130... | 10:17:37 | 30.01.2004 | ☐ | ⓘ | |
| Max. target stock will be exceeded for prod. FRE_PROD_00130 in loc. S130... | 10:17:37 | 30.01.2004 | ☐ | ⓘ | |
| Max. target stock will be exceeded for prod. FRE_PROD_03125 in loc. S130... | 10:17:37 | 30.01.2004 | ☐ | ⓘ | |
| Max. target stock will be exceeded for prod. FRE_PROD_03138 in loc. S130... | 10:17:37 | 30.01.2004 | ☐ | ⓘ | |
| Max. target stock will be exceeded for prod. FRE_PROD_03143 in loc. S130... | 10:17:37 | 30.01.2004 | ☐ | ⓘ | |
| Max. target stock will be exceeded for prod. FRE_PROD_03103 in loc. S130... | 10:17:37 | 30.01.2004 | ☐ | ⓘ | |
| Max. target stock will be exceeded for prod. FRE_PROD_03148 in loc. S130... | 10:17:37 | 30.01.2004 | ☐ | ⓘ | |
| Max. target stock will be exceeded for prod. FRE_PROD_03137 in loc. S130... | 10:17:37 | 30.01.2004 | ☐ | ⓘ | |
| Max. target stock will be exceeded for prod. FRE_PROD_03113 in loc. S130... | 10:17:37 | 30.01.2004 | ☐ | ⓘ | |
| No last successful stock update determined for location S130 | 10:16:58 | 30.01.2004 | ☐ | | |
| No auto. repl. for prod FRE_PROD_03101 in loc. S130: error during schedul... | 15:30:56 | 27.01.2004 | ☐ | | |
| No auto. repl. for prod FRE_PROD_03100 in loc. S130: error during schedul... | 15:30:56 | 27.01.2004 | ☐ | | |
| No auto. repl. for prod FRE_PROD_03102 in loc. S130: error during schedul... | 15:30:56 | 27.01.2004 | ☐ | | |
| No auto. repl. for prod FRE_PROD_03104 in loc. S130: error during schedul... | 15:30:56 | 27.01.2004 | ☐ | | |
| No auto. repl. for prod FRE_PROD_03103 in loc. S130: error during schedul... | 15:30:56 | 27.01.2004 | ☐ | | |
| No auto. repl. for loc S130 error by processing location | 11:52:00 | 26.01.2004 | ☐ | | |
| Max. target stock will be exceeded for prod. FRE_PROD_00138 in loc. S130... | 11:15:02 | 26.01.2004 | ☐ | ⓘ | |
| Max. target stock will be exceeded for prod. FRE_PROD_03142 in loc. S130... | 11:15:02 | 26.01.2004 | ☐ | ⓘ | |
| Max. target stock will be exceeded for prod. FRE_PROD_03124 in loc. S130... | 11:15:02 | 26.01.2004 | ☐ | ⓘ | |
| Max. target stock will be exceeded for prod. FRE_PROD_00134 in loc. S130... | 11:15:02 | 26.01.2004 | ☐ | ⓘ | |
| Max. target stock will be exceeded for prod. FRE_PROD_03118 in loc. S130... | 11:15:02 | 26.01.2004 | ☐ | ⓘ | |
| Max. target stock will be exceeded for prod. FRE_PROD_03133 in loc. S130... | 11:15:02 | 26.01.2004 | ☐ | ⓘ | |
| Max. target stock will be exceeded for prod. FRE_PROD_03116 in loc. S130... | 11:15:02 | 26.01.2004 | ☐ | ⓘ | |
| Max. target stock will be exceeded for prod. FRE_PROD_00131 in loc. S130... | 11:15:02 | 26.01.2004 | ☐ | ⓘ | |
| Max. target stock will be exceeded for prod. FRE_PROD_03121 in loc. S130... | 11:15:02 | 26.01.2004 | ☐ | ⓘ | |

FIG.9

SYSTEM AND METHOD FOR FILTERING EXCEPTIONS GENERATED BY FORECASTING AND REPLENISHMENT ENGINE

CROSS-REFERENCE TO RELATED APPLICATIONS

This application is a continuation of and claims priority under 35 U.S.C. §120 to U.S. patent application Ser. No. 11/135,268, filed on May 24, 2005 now U.S. Pat. No. 7,657,453, and entitled "SYSTEM AND METHOD FOR FILTERING EXCEPTIONS GENERATED BY FORECASTING AND REPLENISHMENT ENGINE," which is herein incorporated by reference in its entirety and which claims priority under 35 U.S.C. §119 to provisional application 60/583,894, filed on Jun. 30, 2004 and entitled "RETAIL FORECASTING AND REPLENISHMENT ENGINE" and to provisional application 60/633,436, filed on Dec. 7, 2004 and entitled "SYSTEM AND METHOD FOR STORING, SELECTING AND FILTERING BUSINESS EXCEPTIONS GENERATED BY A FORECASTING AND REPLENISHMENT ENGINE. All of these applications are incorporated herein by reference in their entireties.

TECHNICAL FIELD

The present invention regards the forecasting and replenishment of business inventory and related merchandise on a periodic or ongoing basis. More specifically, the present invention relates to the selection, filtering, monitoring, review and handling of exceptions generated by automated business forecasting and replenishment processes and systems.

BACKGROUND

Many contemporary businesses, including retail organizations, retail stores, wholesale distributors, manufacturing companies, and the like, perform periodic and ongoing strategic analysis as well as forecasting and automatic replenishment of their various business inventories and supplies in order to improve the efficiency and service levels of their operations. Such strategic forecasting and automatic replenishment systems help to manage inventories and supplies by predicting future throughputs, by quantifying anticipated depletion of raw and finished materials associated with those throughputs, and by quantifying the orders necessary to replenish depleted stocks. The strategic analysis, forecasting and automatic replenishment functions that these systems may perform can include: (1) predicting quantities and profit margins for sales over a specific period of time; (2) predicting the quantities of parts and upstream components that may be required to meet anticipated demand for certain finished goods scheduled to be completed or assembled during a specific period of time; (3) forecasting the lead time to supply materials necessary to meet anticipated demand for finished goods as well as component elements; and (4) predicting the specific demand periods when certain products will be needed. When these automated systems or processes are optimized, businesses may be better positioned to improve profits, increase efficiencies, and reduce waste.

As to specific categories of businesses, a retail mail order company, for example, may use automatic forecasting and replenishment (F&R) systems to stock the minimum amount of product necessary to supply anticipated demand, thereby reducing carrying costs, warehousing costs, and increasing customer satisfaction. As to brick and mortar retailers, a properly run forecasting and replenishment system can ensure that shelves are stocked with the appropriate merchandise to enhance sales and meet anticipated customer demand. Moreover, forecasting and replenishment systems help to ensure that low demand items are not over-bought, thereby minimizing the purchase of slow turnover items and their accompanying large storage costs and high return stock burdens. In each case, the profitability of a business may be optimized and business processes may run more efficiently when an accurate forecast and replenishment system is employed.

The goal of most retail business forecast and replenishment systems is therefore to provide for the automatic replenishment of goods in the right volume and at the right time with minimal human intervention in order to help optimize the profitability and efficiency of business operations. However, because business operations are not perfectly predictable, and because automated F&R processes are often not fully designed to handle each and every situation that may arise relating to the successful management of business inventories, automated forecasting and replenishment systems may generate business exceptions. An exception, in the context of forecasting and replenishment systems, may comprise a message describing a set of error conditions or attributes concerning a business operation. An exception is typically generated because an automated system has detected an error condition, but is unable or has been programmed not to resolve the error condition on its own. The exception is issued so that the associated error conditions and their attributes can be reviewed manually, and a solution can be selected, developed and/or initiated.

Forecasting and replenishment exceptions may cover all kinds of business exceptions, including administrative ones, that relate to a given business process. Depending on the type and size of a business, as well as many other factors, the number of automatically generated exceptions may be quite large. In most forecasting and replenishment systems, exceptions are displayed as transitory dialog messages, which, if not reviewed and handled immediately, are either overwritten by a new exception or they are queued for future review in the order in which they were generated. If a user who is viewing the transitory exception message is not qualified to respond to it, then the exception may go unresolved, either because it may be overwritten or because it may be too difficult to locate at a later time. Similarly, queued exceptions may also go unresolved, simply because of the difficulty in locating queued exceptions that match desired business characteristics, such as a user's area of expertise.

Accordingly, there is a need in the art for a system and method for storing, selecting, filtering, viewing and resolving exceptions generated by forecasting and replenishment processes and systems. Likewise, there is a need in the art for a system and method that will permit a business replenishment specialist who is trained in a specific business area to select, review and respond to filtered forecasting and replenishment exceptions according to the specialist's areas of responsibility and business interest. Additionally, there is a need in the art for a forecasting and replenishment system that automatically provides filtered access to stored business exceptions according to a user's predefined or selected business profile.

BRIEF DESCRIPTION OF THE DRAWINGS

FIG. 7 is a screen shot that depicts a selection screen in accordance with an embodiment of the present invention, in which a user is able to select exceptions that match identified technical attributes.

FIG. 9. is a screen shot depicting a list of exceptions that have been displayed within an exception monitor in response to a user selection.

DETAILED DESCRIPTION

Embodiments of the present invention are directed to a system and method for storing, filtering, selecting and manipulating business exceptions generated by forecasting and replenishment processes and systems. When an exception is generated, it will be associated with attributes corresponding to those business objects and business areas to which the exception relates. Exceptions may also be associated with administrative attributes such as status, priority and generation date, as well as information identifying the specific business process that generated the exception. Generated forecasting and replenishment exceptions may be directed to a transitory dialog message. Alternatively, forecasting and replenishment exceptions may be logged or stored in a database for future review and treatment. Within an exceptions monitor or workbench tool, a business replenishment specialist may browse, search, select, review, filter, rearrange, edit, forward and/or respond to generated exceptions. Exceptions may be filtered tacitly according to a user profile associated with the business replenishment specialist. Alternatively, exceptions may be filtered according to explicitly supplied selection criteria.

Figure 1:
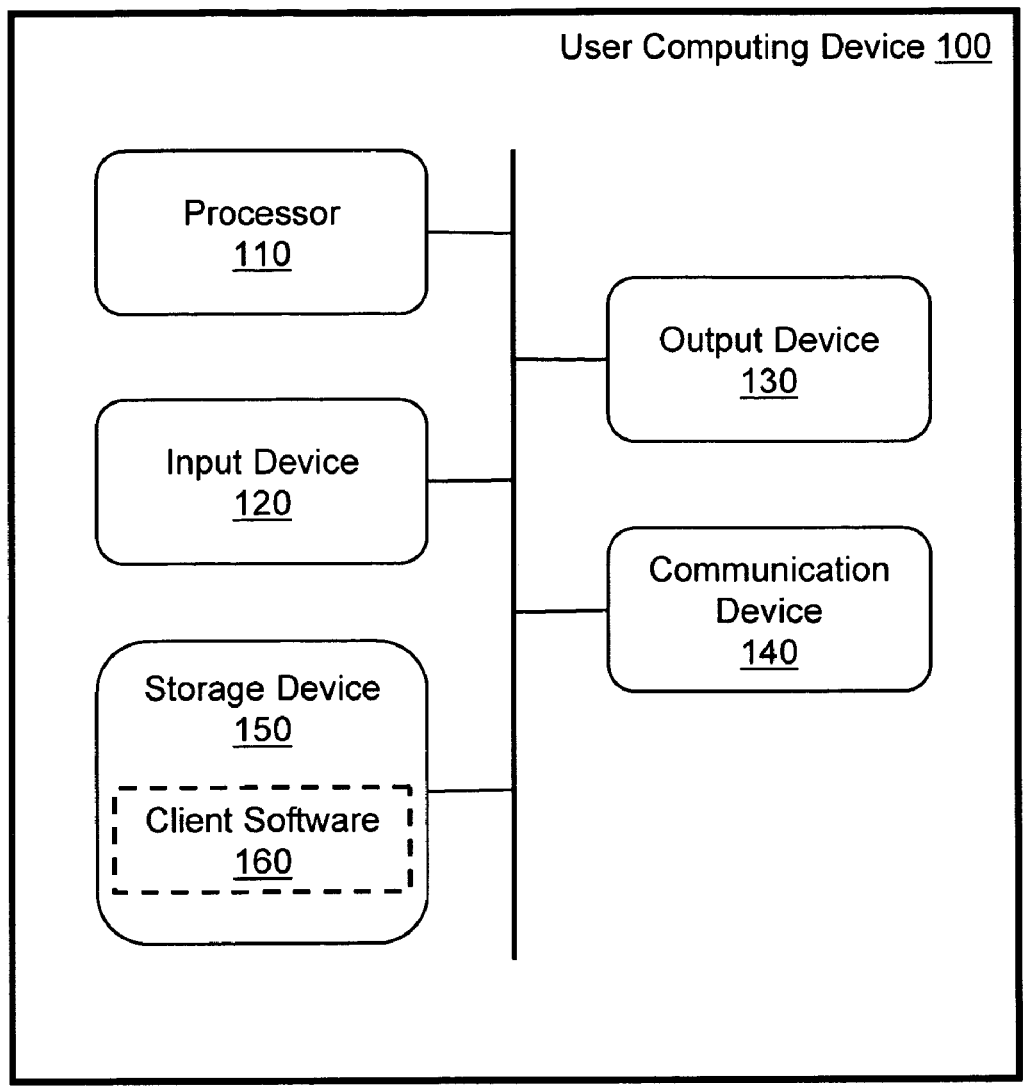
FIG. 1 is a high-level block diagram depicting a computing device incorporating a method and system for storing, selecting, filtering, viewing and resolving exceptions generated by a forecasting and replenishment engine, in accordance with an embodiment of the present invention.
Figure 2:
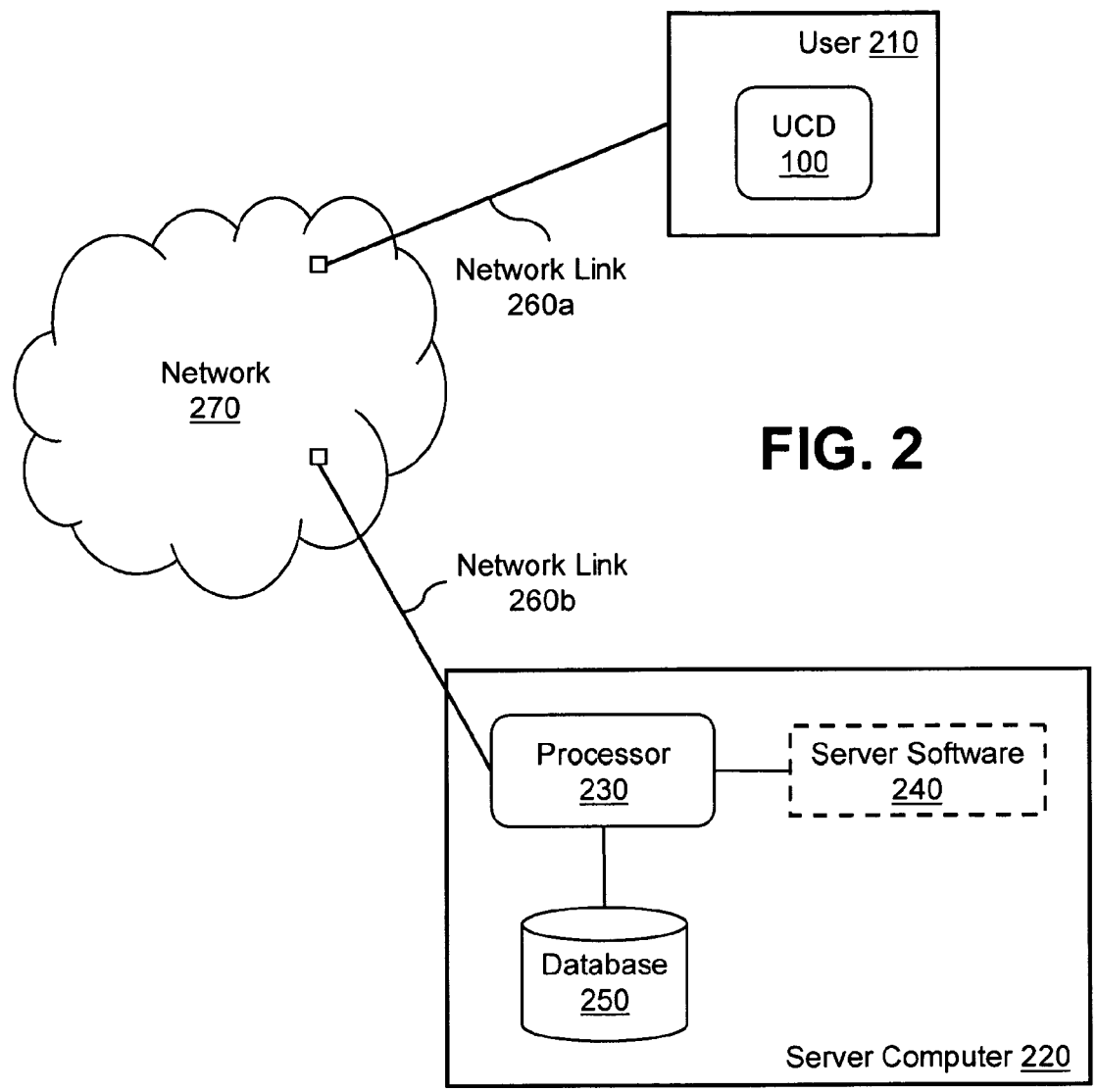
FIG. 2 is a high-level block diagram depicting a network architecture for filtering exceptions generated by a forecasting and replenishment engine, in accordance with an embodiment of the present invention.

FIGS. 1 and 2 illustrate the components of a basic computer and network architecture incorporating a method and system for storing, selecting, filtering, viewing and resolving exceptions generated by a forecasting and replenishment engine, in accordance with an embodiment of the present invention. FIG. 1 depicts user computing device 100, which may be a personal computer, workstation, handheld personal digital assistant ("PDA"), or any other type of microprocessor-based device. User computing device 100 ("UCD") may include a processor 110, input device 120, output device 130, communication device 140, storage device 150, and client software 160.

Input device 120 may include a keyboard, mouse, pen-operated touch screen or monitor, voice-recognition device, or any other device that accepts input. Output device 130 may include a monitor, printer, disk drive, speakers, or any other device that provides output.

Communication device 140 may include a modem, network interface card, or any other device capable of transmitting and receiving signals over a network. Storage device 150 may include volatile and nonvolatile data storage, including one or more electrical, magnetic or optical memories such as a RAM, cache, hard drive, CD-ROM drive, tape drive or removable storage disk. The components of user computing device 100 may be connected via an electrical bus or wirelessly.

Client software 160 may be stored in storage device 150 and executed by processor 110, and may include, for example, the client side of a client/server application that embodies the functionality of the present invention.

FIG. 2 illustrates a network architecture in accordance with an embodiment of the present invention. According to one particular embodiment, when a user 210 invokes a business application, client software 160 of user computing device 100 communicates with server software 240 residing on server computer 220 via network link 260a, network 270, and network link 260b.

Network links 260(a) and 260(b) may include telephone lines, DSL lines, cable networks, T1 or T3 lines, wireless network connections, or any other arrangement that implements the transmission and reception of network signals. Network 270 may include any type of interconnected communication system, and may implement any communications protocol, which may secured by any security protocol.

Server computer 220 may include a plurality of processors 230 and memory (not shown) for executing program instructions, as well as network interfaces (also not shown). Server computer 220 may also comprise a collection of servers, rather than a single server. In one particular embodiment, server 220 may include a combination of enterprise servers such as an application server and a plurality of database servers. Database 250 may represent a relational or object database, and may be accessed via a database server.

User computing device 100 and server 220 may implement any operating system, such as Windows or UNIX. Client software 160 and server software 240 may be written in any programming language, such as C, C++, Java or Visual Basic.

Figure 3:
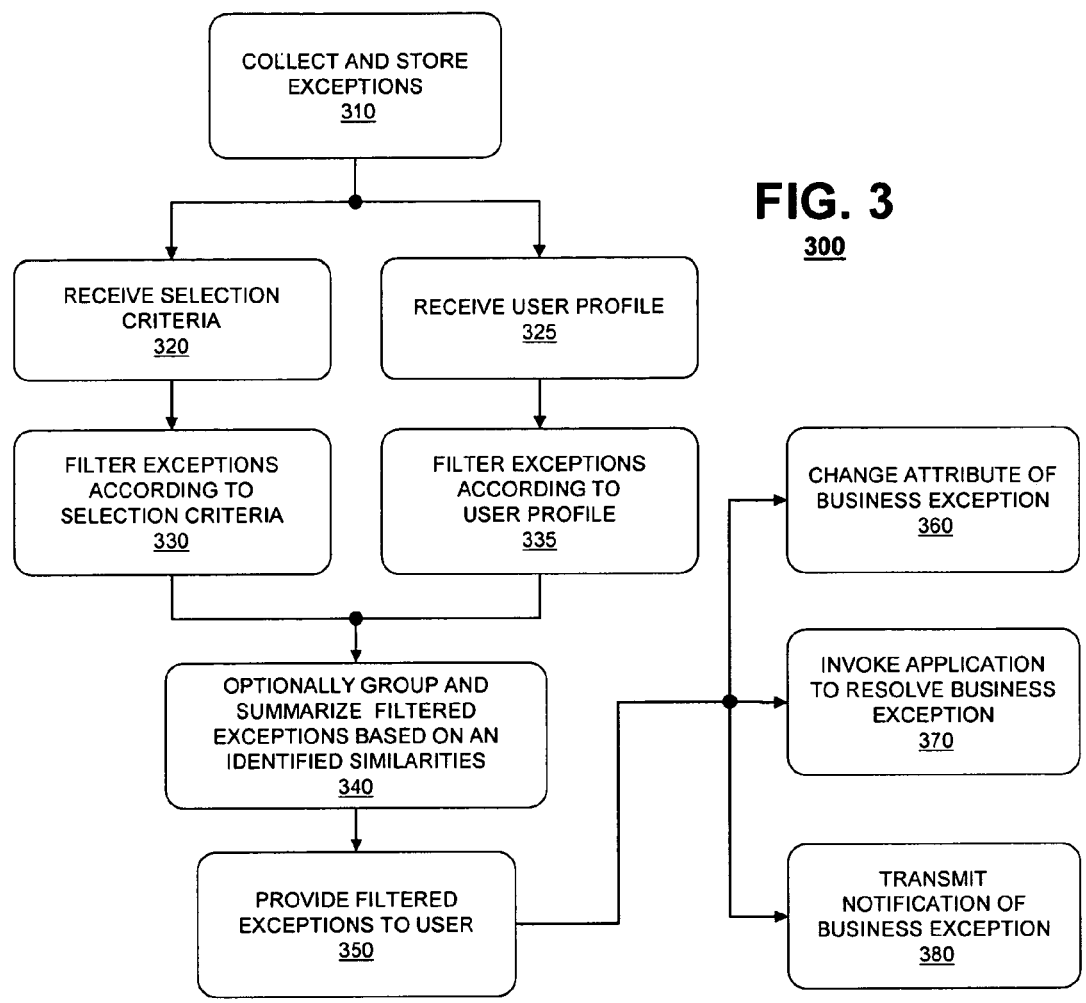
FIG. 3 is a high level flow chart illustrating a method for selecting and filtering exceptions generated by a forecasting and replenishment engine, according to an embodiment of the present invention.

FIG. 3 is a high level flow chart illustrating a method for selecting and filtering exceptions generated by a forecasting and replenishment engine, according to an embodiment of the present invention. Forecasting and replenishment activities are directed toward the automatic replenishment of goods in the right volume and at the right time with minimal human intervention. However, because business operations are not perfectly predictable, and because automated F&R processes are often not fully designed to handle each and every situation that may arise relating to the successful management of business inventories, automated forecasting and replenishment systems may generate business exceptions. An exception is typically generated because an automated system has detected an error condition, but is unable or has not been programmed to resolve the error condition on its own. The exception is issued so that the associated error conditions and their attributes may be reviewed manually by a replenishment specialist or a system administrator, who has the appropriate skills to evaluate an exception and determine the best course of action.

In FIG. 3, an embodiment of the invention allows a replenishment specialist or system administrator to review F&R exceptions or, more generally speaking, to access exception-based automatic replenishment results that were generated by different F&R business processes. Because different replenishment specialists may be interested in different categories of exceptions, embodiments of the invention provide several means by which exceptions may be filtered and selected according to different sets of business-related criteria.

According to an embodiment, the invention may collect and store exception objects (310). An exception object is a software data structure containing information relevant to an exception that occurred during the processing of an F&R business application. This information may include associated business attributes, such as:

Text—summary description of the exception.

Parameters—list of parameter-value pairs that are associated with the exception. The parameters and their values may each describe a certain attribute or object associated with the exception, or they may be useful for subsequent business processes that may be invoked to resolve or rectify the exception.

Priority—the relative importance of an exception so that a subsequent replenishment specialist can distinguish important exceptions from other less important ones. According to an embodiment, a custom default priority may be defined for each type of exception.

Type—different exception types may be defined, including: Abort, Error, Warning, and Information.

Creation time stamp—this time stamp indicates the date and time that an exception was created.

User—the user who initiated the business application that generated the exception.

Program context—the transaction code and name of the business program or application that generated the exception was generated, as well as additional information about that business program or application, such as the computing platform it was running on, the amount of remaining memory available, the processor utilization on the computing platform, and the number of business users connected to the business application. Examples of business programs or applications that may generate exceptions include: Inventory Management, Consumption, Forecast, Replenishment, Order Quantity Optimization, Order Proposal Release Management, Order Proposal Management, and System Administration.

Operating mode—the operating mode of the business program or application that generated the exception (e.g., batch, dialog).

Validity period—relative to the creation time stamp, the date after which an exception is no longer valid.

Status—the status of the exception—that is, whether the exception is still pending, is in the process of being resolved, or has been resolved.

To keep exceptions accessible for different users, an embodiment of the invention may hold exceptions in a data container. A container may be a temporary container (e.g., a buffer table) that holds the exception data on a short-term basis, for example only as long as the exception-generating business process is running. On the other hand, the container may be a persistent container (e.g., a database table) that holds the exception data even after the exception-generating business process has terminated.

According to an embodiment, an exception-generating business process may determine the type of data container (e.g., persistent or temporary) that will be used to hold exceptions. In other embodiments, however, an exception-generating business process may post exceptions to an exception-collecting process, which may then determine whether the received exception data will be held temporarily and possibly displayed in an exception monitor sub-screen, or held persistently and stored in a database or other file format. In the case where exception data are to be held persistently, the exception-collecting process may invoke a service or set of methods that writes the exception data from a temporary buffer table into corresponding database tables. Additionally, the exception-collecting process may also determine whether to invoke other related processes, such as exception display monitors and applications capable of resolving issued exceptions. Pointers to such exception-resolving programs and applications may be stored in other tables maintained in the database.

Figure 4:
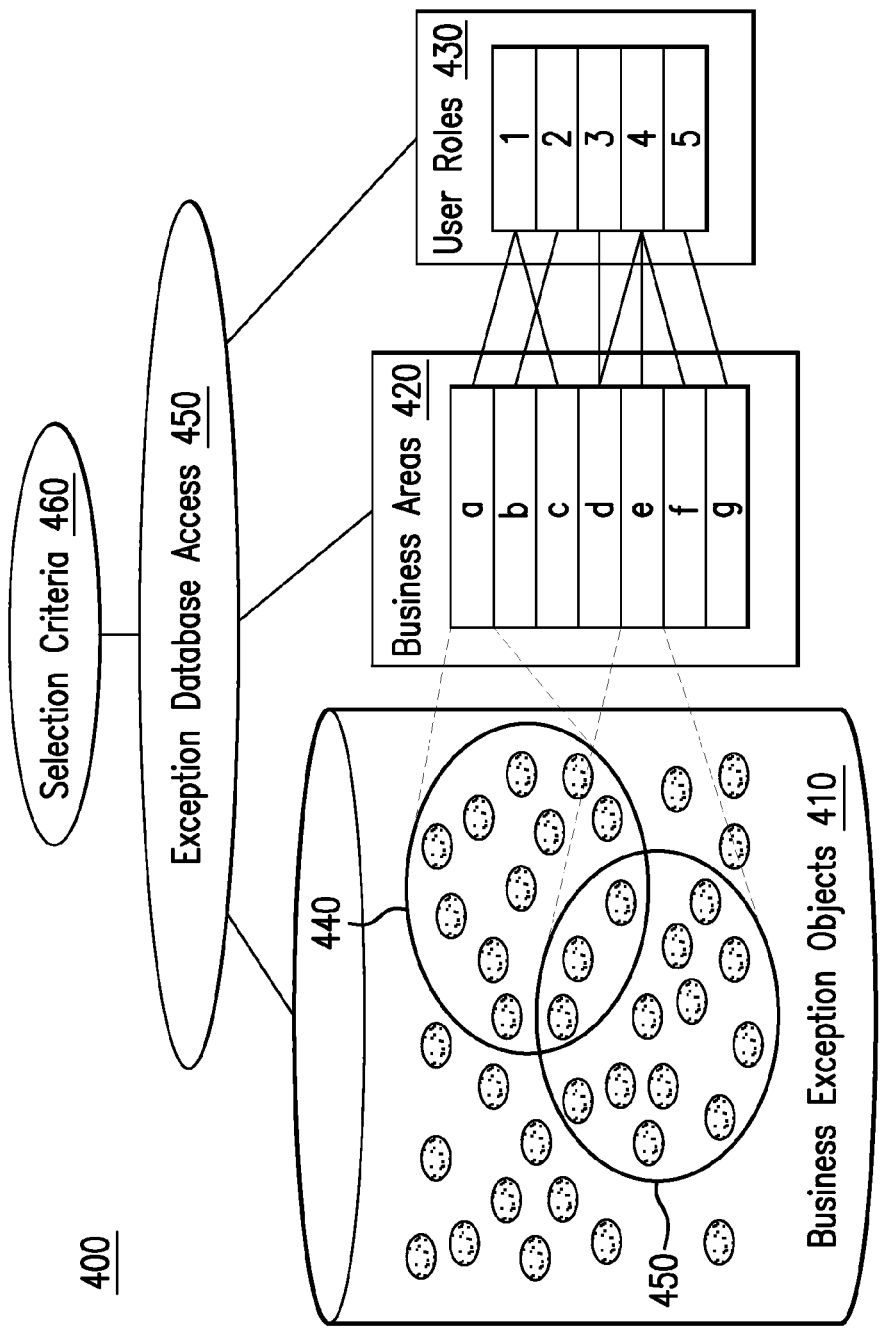
FIG. 4 is a block diagram illustrating a structural abstraction of a database system capable of storing and retrieving business exceptions according to an embodiment of the present invention.

FIG. 4 is a block diagram illustrating a structural abstraction of a database system capable of storing and retrieving business exceptions, according to an embodiment of the present invention. Business exception objects 410 may be stored in the database by several different means, including exception-generating processes and exception-collecting process. Business exception objects 410 may be stored together in a single table or they may be distributed across a plurality of tables according to a variety of methods known in the art.

According to an embodiment, a table in the database may contain a collection of defined business areas 420, each of which may identify a separate business managerial or operational unit. When an exception is generated, its corresponding business exception object may be associated with at least one of the defined business areas 420. For example, in FIG. 4, exception objects 440 are associated with business area 'a' and exception objects 450 are associated with business area 'e'. When generating an F&R (forecasting and replenishment) exception, it should be assigned to those business objects (e.g. locations, products, order proposals etc.) and business areas (e.g. forecast, replenishment, consumption, order quantity optimization etc.) where it belongs. Later on, these business objects and business areas can be used as selection criteria within the exception monitor. Other selection criteria, such as priority, generation date, exception creating program process etc., should also be provided.

Continuing to refer to FIG. 4, another table in the database may contain a list of user roles 430. A user role may be a label describing a user that has been given responsibility for a default set of business areas. For example, a user role may correspond to the ordering and inventory management of component parts for a manufacturing process. Each of the user roles 430 may correspond to one or more business areas 420. This correspondence of user roles 430 and business areas 420 may be described as a "subscription." When searching the database of business exception objects 410, a user may elect to base a search on one of the default user roles 430 or the user may alternatively subscribe directly to a customized set of business areas 420 in order to filter, select, monitor and review a desired set of business exception objects 410.

Business exception objects 410 may be accessed, selected and manipulated through exception database access 450. A set of selection criteria 460 may be supplied to an interface portion of exception database access 450, which may then, depending on the criteria supplied, construct various forms of database selection commands to access the desired business exception objects 410 and return the resulting information to a user. Supplied selection criteria 460 may reference a set of user roles 430, or a set of business areas 420, or the selection criteria 460 may include a database query that identifies specific value constraints for a variety of attributes associated with the business exception objects 410.

Figure 5:
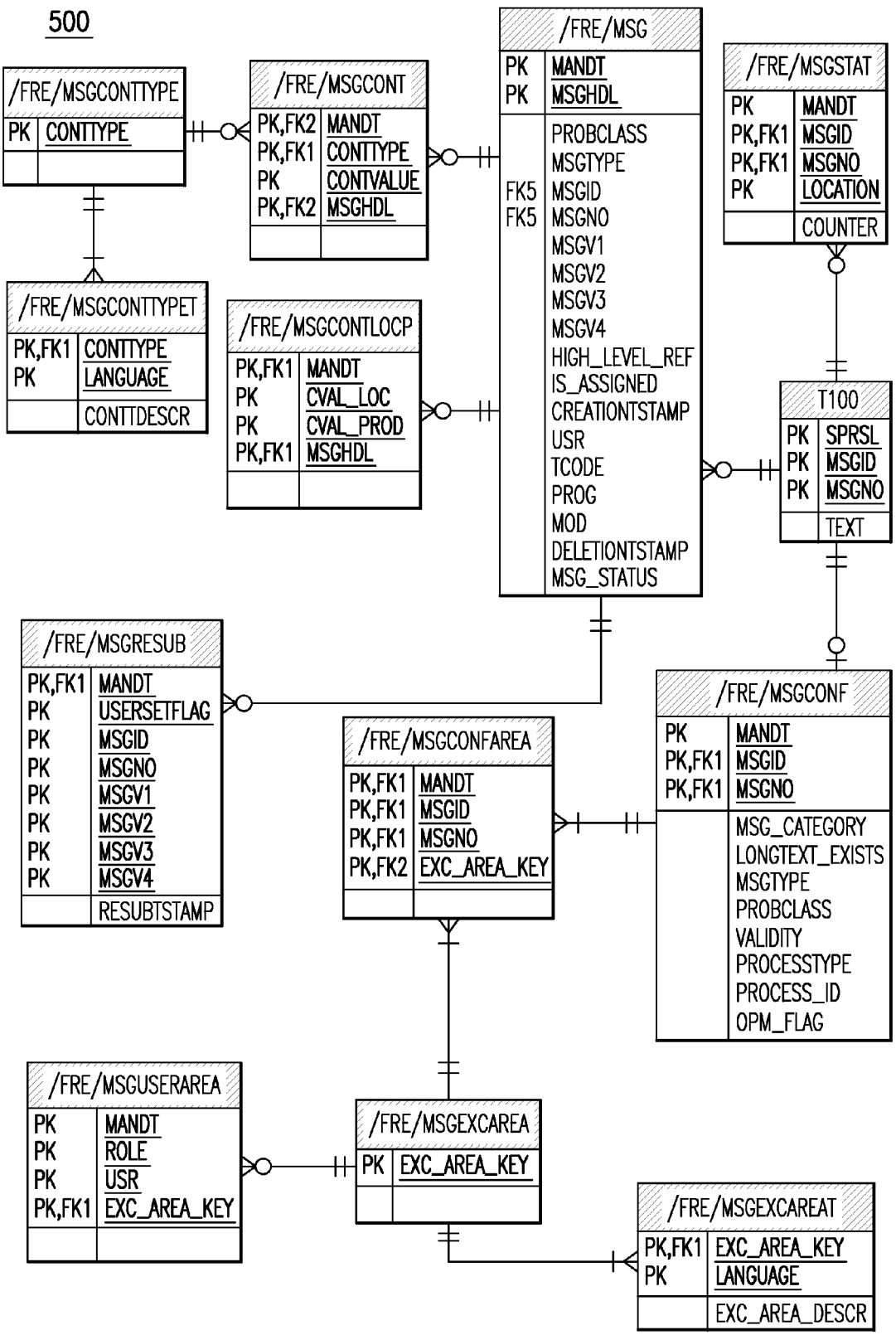
FIG. 5 is an example of an entity-relationship model 500 of selected tables belonging to an exception-handling database, according to an embodiment of the present invention.

FIG. 5 is an example of an entity-relationship model 500 of selected tables belonging to an exception-handling database, according to an embodiment of the present invention. A short summary of some of the selected tables is as follows (the term "FRE" is an abbreviation for Forecasting and Replenishment Exceptions):

| Table Name | Description |
| --- | --- |
| /FRE/MSG | F&R Exception Objects |
| /FRE/MSGCONT | Context data for F&R exception objects |
| /FRE/MSGCONTLOCP | Context data for location products |
| /FRE/MSGCONTTYPE | Defined context types |
| /FRE/MSGCONTTYPET | Text table for defined context types |
| /FRE/MSGCONF | Configuration data for messages |
| /FRE/MSGEXCAREA | Defined exception business areas |
| /FRE/MSGEXCAREAT | Text table for defined exception business areas |
| /FRE/MSGCONFAREA | Assigning of exception business areas to exceptions |
| /FRE/MSGUSERAREA | User specific information about the subscription of exception areas |
| /FRE/MSGRESUB | User specific information about the setting of a resubmission flag |
| /FRE/MSGSTAT | Statistics about generated F&R exceptions |

According to an embodiment, F&R exception objects may be stored in table /FRE/MSG. A key field of this table is a message handle, MSGHDL, which identifies an exception object record. The remaining fields of the table contain other attributes of an exception object. F&R exception object types and their attributes may be stored in table /FRE/MSGCONF. Each F&R exception object type (and therefore each F&R exception object) may be related to one or more exception business areas, which may be stored in table /FRE/MSGEX-CAREA. The relationship between exception object types and business areas is stored in table /FRE/MSGCONFAREA.

There may exist a relationship between user roles and business areas that is stored in table /FRE/MSGUSERAREA. According to an embodiment, replenishment specialists may subscribe to business areas. Utilizing the relationships defined by the database tables in FIG. 5, embodiments of the present invention may enable replenishment specialists to receive and monitor only those exception objects that are instances of the exception object types which are related to those business areas to which the replenishment specialists are subscribed. In other words, if a replenishment specialist invokes an exception monitor program and subscribes to a particular set of business areas, embodiments of the present invention may utilize interrelationships defined in the exception database to retrieve only those stored exceptions that were generated by processes relating to the subscribed business areas.

Figure 6:
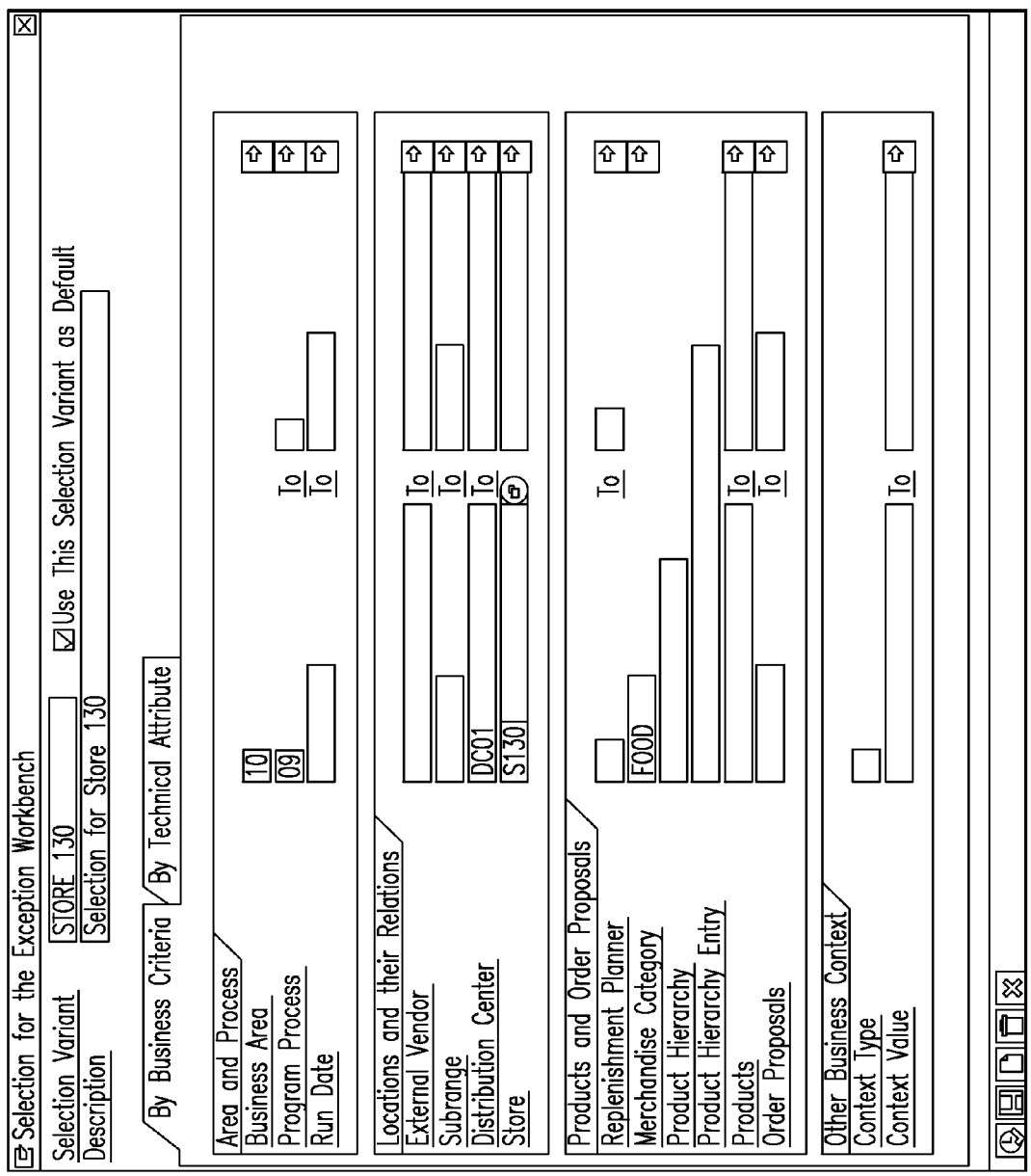
FIG. 6 is a screen shot that depicts a selection screen in accordance with an embodiment of the present invention, in which a user is able to select exceptions that match identified business criteria.
Figure 8:
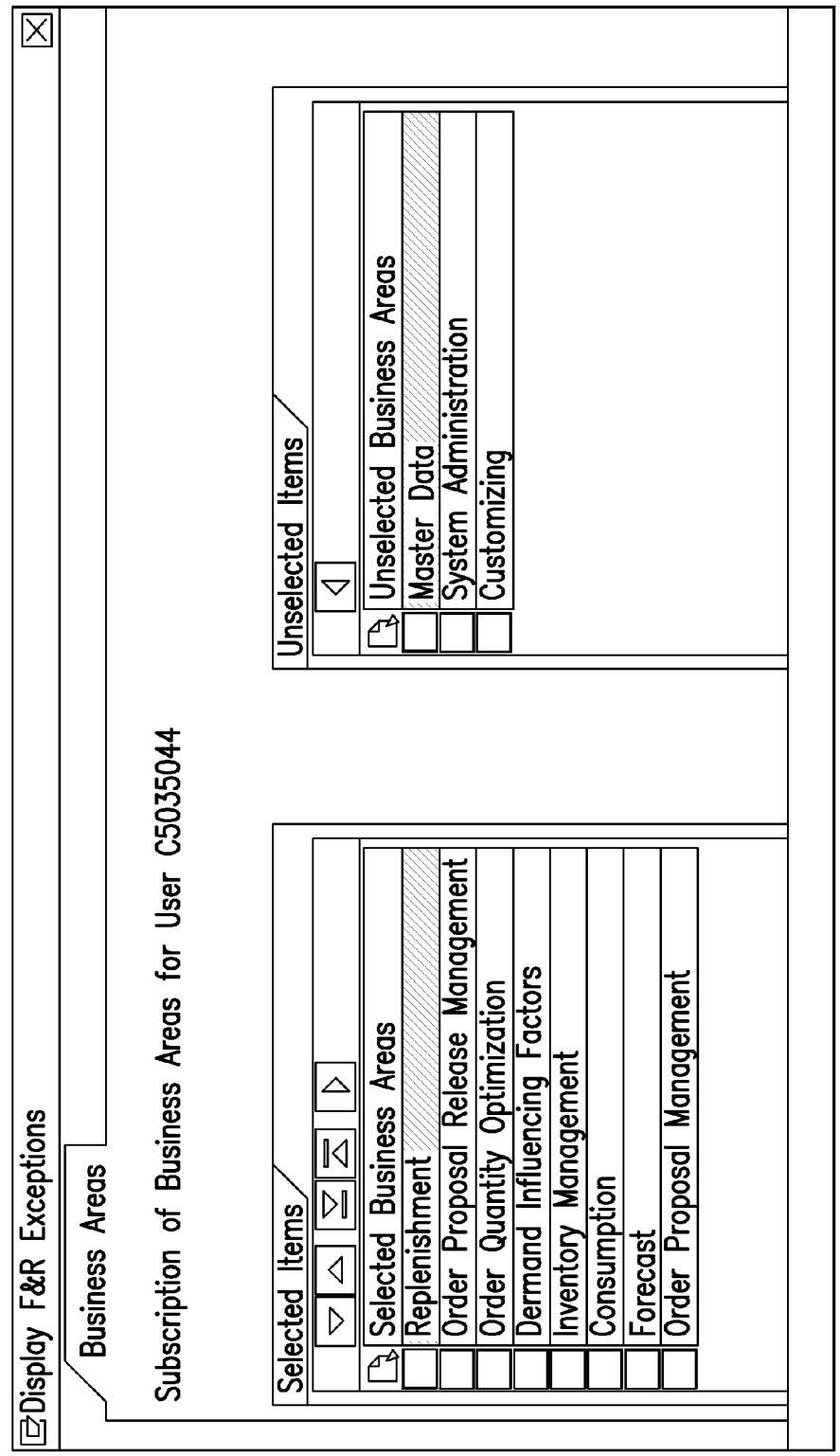
FIG. 8 is a screen shot that depicts a selection screen in accordance with an embodiment of the present invention, in which a user is able to subscribe to business areas that may be used as internal selection criteria for F&R exceptions.

Returning to FIG. 3, an embodiment of the invention may collect and store F&R exceptions (310). F&R exceptions are typically associated with business objects (e.g., locations, products, order proposals, etc.) and/or business areas (e.g., forecast, replenishment, consumption, order quantity optimization etc.) that generated the exception or to which the exception belongs by virtue of its function or subject matter. During subsequent manual analysis, these business objects and business areas can be used as selection criteria. According to an embodiment, the present invention may receive these selection criteria (320) and construct a set of database query instructions to filter the F&R exceptions according to the received selection criteria (330). FIGS. 6, 7 and 8 are screen shots depicting selection screens according to an embodiment of the present invention. In FIG. 6, a user may select or filter F&R exceptions according to business criteria. In FIG. 7, a user may select or filter F&R exceptions according to technical attributes associated with the exceptions. In FIG. 8, a user may subscribe to business areas that may be used as internal selection criteria to retrieve only those F&R exceptions that relate to the subscribed business areas.

In addition to subject matter criteria, the present invention may also receive user profile or role information (325) and then construct a set of database query instructions to filter the F&R exceptions according to the received user profile or role information (335).

FIG. 9. is a screen shot depicting a list of exceptions that have been displayed within an exception monitor in response to a user selection. According to an embodiment, such an exception monitor may group and summarize filtered exceptions according to criteria such as business area, date, assigned product, and assigned location (340 at FIG. 3). If, for example, there are "stock outs" for several location products, multiple single messages of "Stock out for product XX in location YY" may be converted into grouped exceptions, with the information in these messages conveyed in summarized form (for example "Stock out for 20 location products"). Finally, an embodiment of the invention may receive the filtered exceptions from the database and provide the filtered exceptions to the requesting user (350 at FIG. 3).

If a user is momentarily not interested in certain exceptions, an embodiment of the invention enables the user to temporarily disable such exceptions until a definable resubmission date. After having entered and saved the resubmission date, that exception (and all other exceptions with the same semantics) may be removed from the screen. They will reappear after the resubmission date is reached.

Continuing with FIG. 3, an F&R exception may be relevant not only to the user who initially received it in response to a selection query, it may also be relevant to users who work in other areas or even outside the Forecast and Replenishment solution. In case that an F&R user wants to inform other persons about an F&R exception, he can forward this exception to other users (380). A notification can be sent immediately from the exception monitor via e-mail, fax or by a short message service (SMS).

Figure 10:
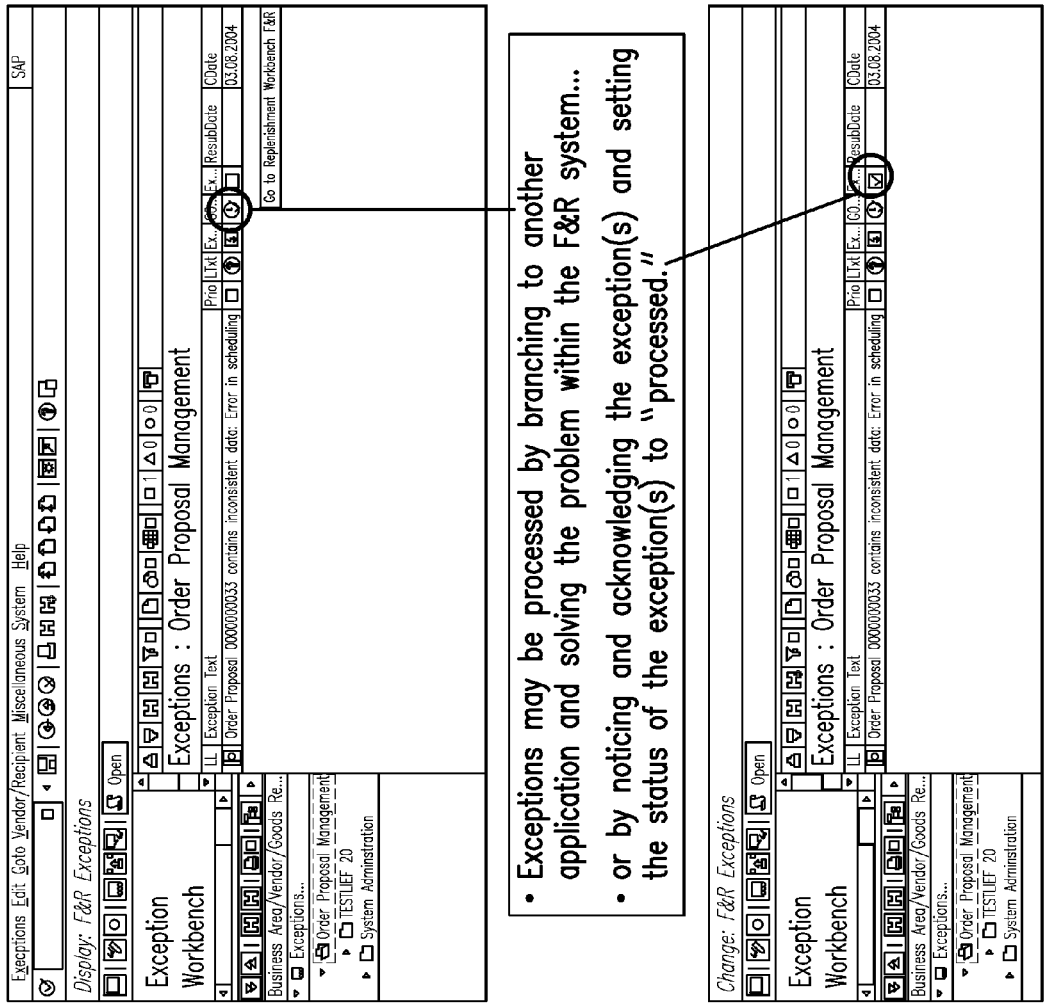
FIG. 10. is a screen shot that depicts a selection screen in accordance with an embodiment of the present invention, in which a user is able to acknowledge or resolve an exception.

According to yet another embodiment, an attribute of an exception may be changed manually (360). For example, a user can set an acknowledge flag which changes the status of the exception. See, e.g., FIG. 10. The setting of this flag may apply not only for this single exception, which the user actually has changed, but implicitly may also affect every other exception with the same semantics (defined by text and text parameters) that has been created on the same replenishment run. If, for instance, the exception "Master data for location 4711 not maintained" has been generated twice in the most recent replenishment run, the status of both exceptions may be set simultaneously.

Additionally, if there is a business process or module that is available to resolve the problem indicated by the exception, the user may branch directly to this application (370). See, e.g., FIG. 10.

Business exceptions are typically short-lived and may be generated in high volumes. To avoid database overflow, an embodiment of the invention may incorporate a database reorganization component that deletes obsolete business exceptions from the database. An exception may become obsolete when its status is set to "processed" or "resolved,"

(or equivalent) or when the exception's expiration date is reached or its validity period has passed.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer-implemented method comprising:
   generating an exception object data record using a processor when an exception occurs during processing of a forecasting and replenishment business application, the exception object data record including a validity period, business attributes, parameters, a priority, an exception type, and a business application that generated the exception;
   including the generated exception object data record in an output during the validity period; and
   responsive to receiving a request to temporarily disable exception object reporting, the request including a resubmission date and an exception object criterion corresponding to data in the generated exception object data record, temporarily removing the generated exception object data record from the output until the resubmission date is reached, at which time the generated exception object data record is re-included in the output wherein the received selection criterion is one of a defined user role, a business area, or one or more specific value constraints defining the at least one business exception object record.

2. The method of claim 1, wherein the resubmission date occurs before an end of the validity period.

3. The method of claim 1, further comprising displaying the output on a screen.

4. The method of claim 3, wherein the generated exception object data record is temporarily removed by removing the generated exception object data record from the screen until the resubmission date is reached, at which time the generated exception object data record reappears on the screen.

5. A computer-implemented method comprising:
   generating an exception object data record when an exception occurs during processing of a forecasting and replenishment business application, the exception object including a validity period and an identifier of a portion of the business application triggering the exception, wherein the validity period further includes a request to temporarily disable exception object reporting and a resubmission date for the exception object,
   posting the generated exception object data record to an exception-collecting process when the resubmission date of the validity period of the exception object data record has passed, and the exception object includes the identified portion of the business application triggering the exception;
   determining, from the exception-collecting process, whether the posted exception object data record is held temporarily or persistently;
   displaying the posted exception object data record determined to be held temporarily; and
   storing in a database the posted exception object data record determined to be held persistently.

6. The method of claim 5, wherein the identifier represents a business object in the business application and the posted exception object data record determined to be held temporarily is displayed while the business application triggering the exception is running.

7. The method of claim 6, wherein the business object represents at least one of: a product, a location, and an order proposal.

8. The method of claim 5, wherein the identifier represents a business area.

9. The method of claim 8, wherein the business area includes at least one of: forecasting, replenishment, consumption, and order quantity optimization.

10. The method of claim 5, further comprising:
    including an attribute in the exception object data record specifying whether the exception object requires user action; and
    deleting exception object data records with attributes that do not require user action before exception object data records with attributes that require user action.

11. The method of claim 5 further comprising:
    invoking a service that writes data from the exception object data record from a temporary buffer table into a corresponding table in the database when the posted exception object data record is determined to be held persistently.

12. The method of claim 11, wherein the database stores the data from the exception object data record after the business application triggering the exception has terminated.

13. The method of claim 5, further comprising invoking an application capable of resolving the exception.

14. The method of claim 13, further comprising invoking an exception display monitor.

15. The method of claim 13, wherein a pointer to the application capable of resolving the exception is stored in the database.

16. The method of claim 11, further comprising storing the posted exception object data record determined to be held temporarily in a temporary container after setting the attribute in the exception object to not requiring user action.

17. The method of claim 5, further comprising storing the posted exception object data record determined to be held temporarily in a temporary container only while the business application triggering the exception is running.

18. A system comprising:
    a processor; and
    a memory connected to the processor, the memory contain a plurality of instructions that, when executed by the processor, cause the processor to:
    generate an exception object data record when an exception occurs during processing of a forecasting and replenishment business application using a processor, the exception object data record including a validity period, business attributes, parameters, a priority, an exception type, and a business application that generated the exception,
    include the generated exception object data record in an output during the validity period; and
    responsive to receiving a request to temporarily disable exception object reporting, the request including a resubmission date and an exception object criterion corresponding to data in the generated exception object data record, temporarily remove the generated exception object data record from the output until the resubmission date is reached, at which time the generated exception object data record is re-included in the output, wherein the received selection criterion is one of a defined user role, a business area, or one or more specific value constraints defining the at least one business exception object record.

19. A computer-readable storage medium tangibly storing a plurality of instructions, which, when executed by a processor, cause the processor to perform the steps comprising:

generating an exception object data record when an exception occurs during processing of a forecasting and replenishment business application, the exception object data record including a validity period and an identifier of a portion of the business application triggering the exception, wherein the validity period further includes a request to temporarily disable exception object reporting and a resubmission date for the exception object, posting the generated exception object data record to an exception-collecting process when the resubmission date of the validity period of the exception object data record has passed, and the exception object includes the identified portion of the business application triggering the exception;

determining, from the exception-collecting process, whether the posted exception object data record is held temporarily or persistently;

displaying the posted exception object data record determined to be held temporarily; and storing in a database the posted exception object data record determined to be held persistently.

* * * * *